Aug. 7, 1945.   F. W. IDEN   2,380,966

ALTERNATOR

Filed Sept. 16, 1942

INVENTOR.
FLOYD WILLIAM IDEN
BY
*ED Phinney*
ATTORNEY

Patented Aug. 7, 1945

2,380,966

UNITED STATES PATENT OFFICE 2,380,966

ALTERNATOR

Floyd William Iden, Newark, N. J., assignor to Federal Telephone and Radio Corporation, a corporation of Delaware Application September 16, 1942, Serial No. 458,495

9 Claims. (Cl. 171—252)

This invention relates to alternating current generators or alternators and in particular to alternators which develop polyphase voltages.

The alternator of my invention was primarily developed as a power source for emergency radio apparatus to be employed with inflated rubber life boats. Emergency radio apparatus usually employs the simplest of electrical circuits and the minimum of equipment consistent with a desired power output and reasonable efficiency. Self rectified oscillator circuits adequately meet the requirements for simplicity and efficiency but they must necessarily employ a power supply having a 180° phase relation of voltages.

One known way of obtaining such a phase relation of voltages is to produce a single phase voltage, and connect it to the primary of a transformer the secondary of which has an intermediate tap. The two voltages on either side of the intermediate tap have a 180° phase relation. However, such a method involves the use of apparatus, in addition to the alternator, namely, the transformer, and the weight of and the space occupied by this unit would be very undesirable.

In accordance with my invention, two voltages are generated, and then they are divided and recombined in such a manner that regardless of the magnitude and phase relation of the original voltages the resultant combined voltages are equal in magnitude and 180° out of phase.

It is therefore an object of my invention to devise an alternator which generates two voltages which automatically maintain a 180° phase relation.

The above mentioned object and further advantages of my invention and the manner of obtaining them will be explained in the following description taken in conjunction with the accompaying drawings in which.

According to one aspect of my invention the alternator may be considered as two alternators with separate stators and rotors, the latter being fixedly mounted on a single shaft. The armature coils of the two alternators are so connected that the desired 180° phase relation of voltage is maintained even though the voltage developed in one armature is not in phase with that developed in the other armature.

Figure 1:
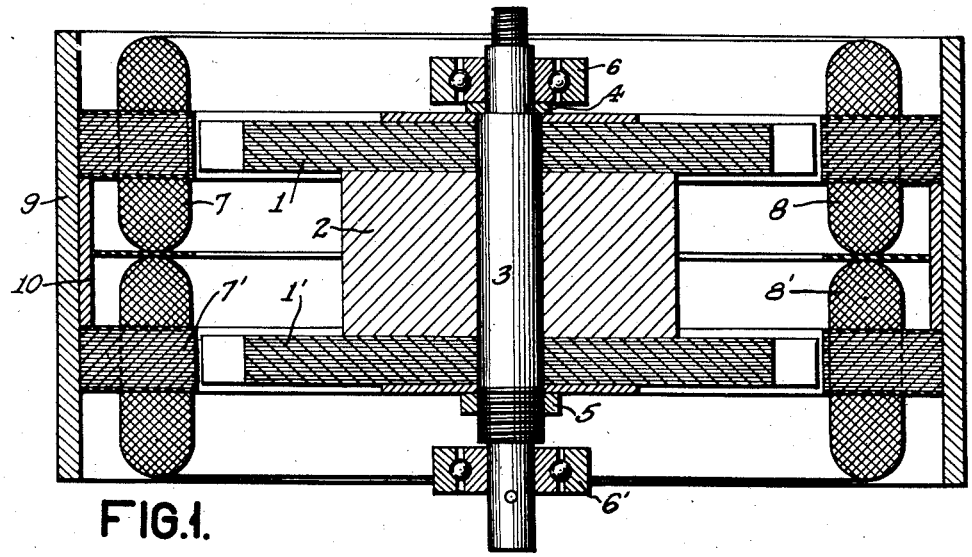
Fig. 1 is a sectional view taken through the axis of rotation of the alternator.

Referring to Fig. 1, the numerals 1 and 1' represent the two stacks of laminations which together with the permanent magnet 2 and shaft 3 comprise the rotor of the alternator. The laminations and magnet are rigidly held in positions on the shaft by clamping them between the flange 4 and the nut 5. The shaft rotates in bearings 6 and 6' which are mounted in the end shields (not shown) of the alternator.

The stator or armature of the alternator consists of two stacks of laminations 7 and 7' spaced similarly to those on the rotor, together with the armature windings 8 and 8', and the steel yoke 9 and spacer 10. The yoke and spacer serve as a frame for holding the stator laminations in place and also serve as part of a magnetic circuit between the two sets of laminations. The return magnetic circuit for one rotor and stator combination comprises the second rotor and stator. For example, the return magnetic circuit for the rotor 1 and stator 7 comprises the yoke 9 with spacer 10, stator laminations 7', rotor laminations 1' and permanent magnet 2.

Figure 2:
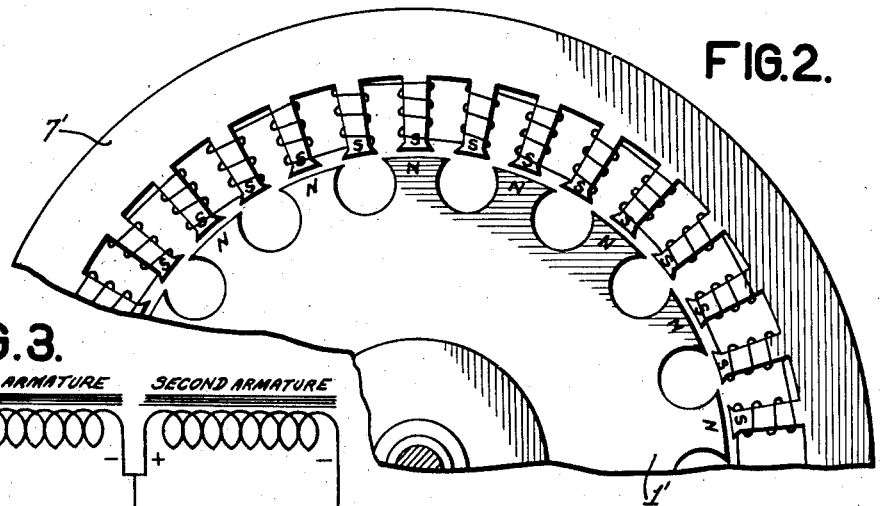
Fig. 2 is a view of the alternator laminations taken perpendicular to the axis of rotation.

Fig. 2 shows a fragmentary section of the rotor and stator laminations and illustrate the manner in which the armature coils are connected in the latter. There are twice as many poles on the stator as there are poles on the rotor and due to the permanent magnet all poles of one stator are of one polarity, say south, and all poles of the corresponding rotor are of the opposite polarity, north. The polarities of the poles of the second stator and rotor are reversed. As the rotor is revolved the magnetic flux between one rotor pole and one stator pole is increasing while the flux between the same rotor pole and an adjacent stator pole is decreasing. Thus the generated E. M. F. is due to a change in flux in the stator poles and not to a reversal of flux.

In the illustration of Fig. 2, there are a total of 36 poles on the stator and 18 poles on the rotor. Therefore, for one revolution of the rotor, 18 cycles will be generated and if the rotor makes 1800 R. P. M. (or 30 R. P. S.) a 540 cycle per second alternating voltage will be developed. The magnitude of this voltage (other things being equal) will depend on the total number of turns of the armature coils since all coils are connected in series.

What has just been said of one rotor and stator combination is of course also true of the second combination. If the stator poles of each combination are so positioned with respect to their corresponding rotor poles that a maximum voltage is developed in each combination simultaneously, a series connection between the coils of the two stators can be made which will develop a maximum voltage equal to the sum of the separate voltages. A center tap connection between the two stator windings will permit the obtaining of two voltages having a 180° phase relation.

Figure 3:
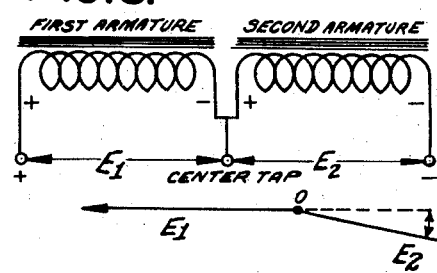
Fig. 3 is a winding and vector diagram showing an undesired phase relation of voltages which my invention corrects.

However, it has been found difficult to so align the rotor and stator combinations that a maximum voltage is developed in the armature coils simultaneously, with the result that a phase displacement occurs and the desired 180° phase relation no longer exists. It is the object of my invention to correct this condition, which is illustrated by the winding and vector diagram of Fig. 3. In this figure, $E_1$ represents the voltage developed in the armature coils of one stator and $E_2$ represents the voltage developed in the armature coils of the second stator. $\phi$ is the phase displacement from the desired 180° phase opposition relation.

Figure 5:
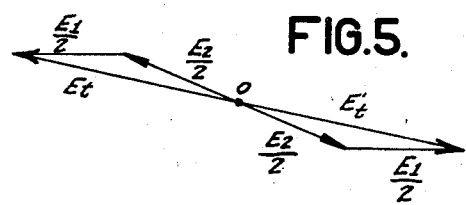
Fig. 5 is a vector diagram showing the phase relations of voltages developed in the armature coils.
Figure 4:
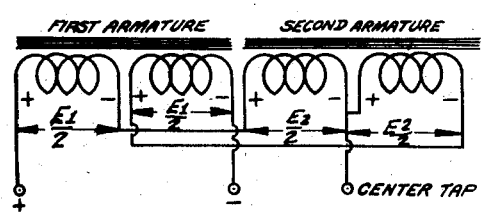
Fig. 4 is a schematic wiring diagram showing the manner in which the armature coils of the alternator are connected so as to give two voltages having a 180° phase relation.

Referring now to Fig. 4 it will be seen that when the armature coils of each stator are series connected into two separate groups, and a group of one stator is connected in series with a group of the second stator, and the four groups connected in series with a center tap so their voltages are additive, a vector diagram representing these voltages will result as shown in Fig. 5. The total voltages $E_t$ and $E_t'$ are obviously the sum of the partial voltages $$\frac{E1}{2}$$

and $$\frac{E2}{2}$$

and always maintain a 180° phase relation. For example, in the illustrated case wherein the stators have 36 coils, 18 adjacent coils may be connected in series to form one group while the remaining 18 coils may form the second group. On the other hand, every other coil around the armature may be series connected to form one group while the intermediate coils are series connected to form the second group. Should there be any eccentricity between the rotor and stator whereby the flux gaps between their poles would vary, it would be preferable to connect every other coil in series to form a group. This would tend to equalize the voltages developed in the two groups.

While my invention has been described as it would apply to two rotors and to two stators mounted in a single machine, the same conditions would exist if two separate machines were employed and driven synchronously. The only requirement is that the voltages developed in the armature windings of each machine are so added that a vector diagram of these voltages would give a result as shown in Fig. 5. If the two machines were not driven synchronously the two resultant total voltages would still maintain a 180° phase relation but their amplitudes would vary. In certain instances this variation in amplitude might prove to be a very valuable feature as, for example, in certain types of radio transmitters, wherein it would be desirable to superimpose a relative low modulation upon the alternating current which would normally result if the two machines were synchronously driven. The same result could also be obtained if the two machines were mounted in a single frame with the rotors on a common shaft, as illustrated in Figs. 1 and 2 of this specification, but with each machine having a different number of poles.

Having thus described my invention, I claim:

1. An alternator for generating two voltages having a 180° phase relation comprising a frame, two stators mounted in said frame, two rotors mounted on a common shaft and adapted to be rotated within said stators, means for creating a magnetic flux in said rotors and stators, an armature winding on each of said stators consisting of two groups of coils, and electrical connections for connecting a coil group of one stator in series with a group of the other stator and for connecting the four groups in series with a center tap whereby voltage generated in one armature winding is added to the voltage generated in the other armature winding to produce one of the said 180° phase related voltages.

2. Means for generating two voltages having a 180° phase relation comprising two alternators arranged in phase displaced relation each alternator having a rotor element and a stator element, separate means for creating a magnetic flux in each alternator, an armature winding on each of said stators consisting of two groups of coils, and electrical connections for connecting a coil group of one stator in series with a group of the other stator and for connecting the four groups in series with a common output connection whereby voltage generated in one armature winding is added to the voltage generated in the other armature winding to produce one of the said 180° phase related voltages.

3. An alternator for generating two voltages having a 180° phase relation in accordance with claim 1 characterized by the fact that the number of poles on one of the stators is equal to the number of poles on the other stator and that the number of poles on one of the rotors is equal to the number of poles on the other rotor.

4. Means for generating two voltages having a 180° phase relation in accordance with claim 2 characterized by the fact that the number of poles on the stator and rotor of one alternator is equal to the number of poles on the stator and rotor of the other alternator, and means for synchronously rotating said rotors.

5. Means for generating two voltages having a 180° phase relation in accordance with claim 2 characterized in that the frequency generated by one rotor and stator element is equal to the frequency generated by the other rotor and stator element.

6. An alternator for generating two voltages having a 180° phase relation in accordance with claim 1 characterized by the fact the two voltages are generated by flux changes in a magnetic circuit which is common to the two rotors and the two stators.

7. An alternator for generating two voltages having a 180° phase relation in accordance with claim 1 characterized by the fact that the magnetic polarity of one rotor is opposite to the magnetic polarity of the second rotor.

8. An alternator for generating two equal 180° phase related voltages comprising means for generating a first and second voltage having other than a 180° phase relation, means for dividing each of said voltages into a plurality of voltages, means for combining a portion of said divided voltages of said first voltage with a portion of said divided voltages of said second voltage to procure one of the 180° phase related voltages, and means for combining the remainder of said voltages to produce the other of the 180° phase related voltages.

9. An alternator for generating two voltages having a 180° phase relation comprising a frame, two stators mounted in said frame, two rotors mounted on a common shaft and adapted to be rotated within said stators, means for creating a magnetic flux in said rotors and stators, an armature winding on each of said stators and subdivided into multiple groups, and series electrical connections between groups of windings of one stator and corresponding groups of the other stator and for connecting the groups in series with a center tap whereby voltage generated in the windings of one stator is added to the voltage generated in the windings of the other stator to produce one of the said 180° phase related voltages.

FLOYD WILLIAM IDEN.